US008471690B2

(12) United States Patent
Hennig et al.

(10) Patent No.: US 8,471,690 B2
(45) Date of Patent: Jun. 25, 2013

(54) DEVICE FOR PRODUCING A HAPTIC FEEDBACK FROM A KEYLESS INPUT UNIT

(75) Inventors: Eberhard Hennig, Moersdorf (DE); Peter Ditas, Muenchenbernsdorf (DE)

(73) Assignee: PI Ceramic GmbH, Lederhose (DE)

( * ) Notice: Subject to any disclaimer, the term of this patent is extended or adjusted under 35 U.S.C. 154(b) by 278 days.

(21) Appl. No.: 12/808,104

(22) PCT Filed: Mar. 30, 2010

(86) PCT No.: PCT/EP2010/002018
§ 371 (c)(1),
(2), (4) Date: Jul. 9, 2010

(87) PCT Pub. No.: WO2010/112198
PCT Pub. Date: Oct. 7, 2010

(65) Prior Publication Data
US 2011/0050406 A1 Mar. 3, 2011

(51) Int. Cl.
*G08B 6/00* (2006.01)
(52) U.S. Cl.
USPC .................. 340/407.2; 340/568.1; 340/5.1
(58) Field of Classification Search
USPC ............ 340/407.2, 5.1, 5.2, 5.7, 5.72, 10.1, 340/568.1, 572.1, 572.7, 572.3, 572.8, 665–666
See application file for complete search history.

(56) References Cited

U.S. PATENT DOCUMENTS

| | | | |
|---|---|---|---|
| 6,429,849 B1 * | 8/2002 | An et al. ................. | 345/161 |
| 7,176,892 B2 * | 2/2007 | Kobayashi ............... | 345/161 |
| 7,324,094 B2 | 1/2008 | Moilanen et al. | |

(Continued)

FOREIGN PATENT DOCUMENTS

| | | |
|---|---|---|
| DE | 11 2005 002 107 T5 | 10/2007 |
| EP | 1 544 720 | 6/2005 |
| EP | 1 566 728 | 8/2005 |
| WO | WO 2008/125130 A1 | 10/2008 |

OTHER PUBLICATIONS

Office Action dated Dec. 18, 2012 issued by the European Patent Office in corresponding European Patent Application No. 10 717 042.5.

*Primary Examiner* — Daniel Previl
(74) *Attorney, Agent, or Firm* — Buchanan Ingersoll & Rooney PC

(57) ABSTRACT

The invention relates to a device for the production of a haptic feedback from keyless input units such as touchscreens or keypads in mobile IT devices such as mobile telephones, PDAs, music or multimedia players, cameras, navigation devices, etc. The market demands a device which can produce a haptic signal for a touchscreen such that the display is movable as a whole essentially perpendicular to the housing surface at least in one direction. In order to resolve this object the invention provides for a device for the production of a haptic feedback from a keyless input unit, whereby the device has an elastic, essentially plate-shaped substrate, which at least comprises a first support location for fixing the substrate on a structure of the input device and at least a second support location for fixing the substrate on the input unit, and is formed to support the input unit movably with respect to the structure of the input device, whereby a piezoelectric element between the first and second support locations of the substrate is arranged in such a manner that with an electrical drive to the piezoelectric element one of the support locations is moved transverse to the plane of the plate-shaped substrate.

20 Claims, 2 Drawing Sheets

U.S. PATENT DOCUMENTS

Figure 1:
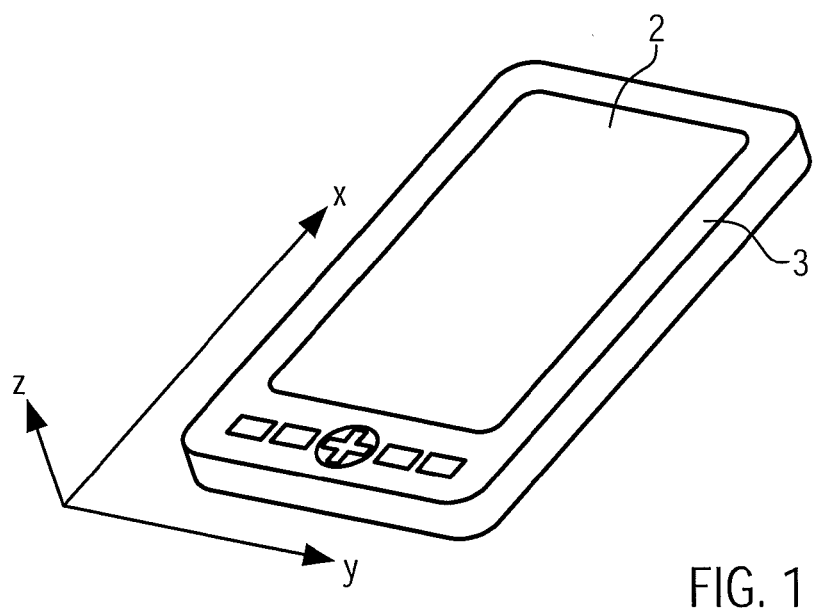

| | | |
|---|---|---|
| 7,663,604 B2 | 2/2010 | Maruyama et al. |
| 7,688,310 B2 * | 3/2010 | Rosenberg .................... 345/168 |
| 2004/0227721 A1 | 11/2004 | Moilanen et al. |
| 2005/0253643 A1 | 11/2005 | Inokawa et al. |
| 2006/0028095 A1 | 2/2006 | Maruyama et al. |
| 2007/0080951 A1 | 4/2007 | Maruyama et al. |
| 2007/0146348 A1 | 6/2007 | Villain |
| 2008/0100177 A1 | 5/2008 | Dai et al. |
| 2008/0122315 A1 | 5/2008 | Maruyama et al. |
| 2008/0236632 A1 * | 10/2008 | D'Urso et al. .................. 134/32 |
| 2008/0251364 A1 | 10/2008 | Takala et al. |
| 2009/0167722 A1 | 7/2009 | Villain |
| 2010/0052880 A1 | 3/2010 | Laitinen et al. |

\* cited by examiner

DEVICE FOR PRODUCING A HAPTIC FEEDBACK FROM A KEYLESS INPUT UNIT

The invention relates to a device for the production of a haptic feedback from keyless input units such as touchscreens or keypads in mobile IT devices such as mobile telephones, portable digital assistants (PDAs), music or multimedia players, cameras, navigation devices, etc.

In particular the invention takes into account the current requirements of the market according to which IT devices are required with which the display of a keyless input unit, in particular of a touchscreen, is movable at least in one direction as a whole essentially perpendicular to the housing surface.

In U.S. Pat. No. 7,324,094 B2 the use, for example, of a piezoelectric bending element is described, which generates a vibration signal for the production of haptic feedback following an operational step by the user. In this connection the vibration signal from the piezoelectric bending element is transferred to a lens which overlays and protrudes over the display. In more detail, the vibrating element is arranged at a point of the lens which is located outside of the overlay region between the lens and display.

Also in WO 2008/125130 A1 the use of a piezoelectric bending element is described which is characterised both by an actuating function as well as by a sensory function. The piezoelectric bending element is in this connection arranged in a keypad or touchpad which has several different layers or laminations exhibiting functions. The piezoelectric bending element represents one of these layers or laminations, whereby it has essentially the same size as the other layers or laminations. When the user registers an operational step, for example a key depression, the piezoelectric bending element produces vibrations, which are transmitted to the layers arranged over it to the surface of the keypad or touchpad and can be registered by the user as haptic feedback.

In both of the previously mentioned publications no mention could be found indicating a solution to the above problem, i.e. the lifting of the display as a whole. In DE 11 2005 002 107 T5 a tactile front panel is described which exhibits the features of a haptic feedback through a mechanical pulse with a vertical principal direction. However, here the pulse is generated by a purely mechanical solution, i.e. due to an abrupt deformation (subsidence) of an elastically deformable element. In a special version reference is made to a "piezoelectric probe" with which however the front panel is not movable.

From the available information it must be assumed that for the problem definition described above, that is the movement of the display of a keyless input unit as a whole in at least one direction essentially perpendicular to the housing surface, no satisfactory solution is known, in particular with regard to easy assembly and the suitability for economical large-scale production.

In order to resolve the above mentioned object the invention provides for a device for the production of a haptic feedback from a keyless input unit, whereby the device has an elastic, essentially plate-shaped substrate, which at least comprises a first support location for fixing the substrate on a structure of the input device and at least a second support location for fixing the substrate on the input unit, and is formed to support the input unit movably with respect to the structure of the input device, whereby a piezoelectric element between the first and second support locations of the substrate is arranged in such a manner that with an electrical drive to the piezoelectric element one of the support locations transverse to the plane of the plate-shaped substrate, preferably essentially perpendicular to the plane of the plate-shaped substrate, is moved out of the plane of the plate-shaped substrate. The movement can produce a haptic signal for the input unit such that the input unit (e.g. touchscreen) is moved as a whole at least in one direction essentially perpendicular to the structure of the input device (e.g. housing surface). The device forms a piezoelectric actuator which is preferably coupled to the four corners of the display. An actuator of this nature has a rugged construction and can be produced and assembled economically.

Under the aspect of miniaturisation it can be helpful if the piezoelectric element is embedded in the substrate. In this way the installed height of the device according to the invention is reduced.

In order to produce a haptic signal in two directions, it can be useful if a piezoelectric element is fitted to an upper side and/or an underside of the substrate.

It can be practicable if several second support locations are arranged symmetrically, preferably mirrored about an axis, favourably mirrored about two axes, in particular mirrored about two perpendicular axes on the substrate. In this way unwanted slopes and tilt movements of the keyless input unit with respect to a housing surface of the input unit can be largely prevented.

It can be advantageous if the first and second support locations are situated on the first and second support sections of the substrate which are connected by a ridge. Preferably the ridge of the substrate is substantially thinner in relationship to the first and second support sections of the substrate, so that the first and second support sections can deform largely independently of one another, in particular in a direction lateral or perpendicular to the plane of the plate-shaped substrate.

Under the aspect of an economical production and assembly of the device according to the invention it can be helpful if at least one of the support sections, preferably the first and second support sections is/are cut free out of the substrate. In this way the substrate can be punched essentially from a rectangular or square plate and the number of single parts reduced.

It may prove to be advantageous if the support sections extend in each case laterally, preferably perpendicular to the ridge, preferably on both sides of the ridge. In this way particularly the free ends of the support sections, which are joined by the ridge, can be formed to be easily movable with respect to one another, even if they lie close together.

It may prove to be practicable if a second support location is arranged on a free end of a second support section. In this way an induced bending movement of the second support section can be optimally transferred via the second support location to the input unit in order to generate a haptic signal.

Under the aspect of an even support of the input unit it can be advantageous if a first support section is arranged between two second support sections and/or vice versa.

For the even support of the input unit it can however also be advantageous if at least one first support section forms a frame surrounding a second support section over half its circumference, preferably over its complete circumference and/or vice versa. In this version the substrate also has a particularly strong and torsionally stiff structure.

It can be helpful if the piezoelectric element is arranged in or on a second support section. The piezoelectric element arranged in or on a second support section induces a bending of the second support section which can be optimally transferred via the second support location to the input unit to be coupled.

It can be useful if the substrate is formed in one piece. In this way the production and assembly of the device according to the invention is simplified.

It can be advantageous if the substrate is produced from circuit board material, metal, plastic or ceramics. Materials of this nature exhibit the preferred properties as a substrate, they are generally economical and easy to work.

It may prove to be practicable if the substrate is produced from electrically conducting material and/or is coated with electrically conducting material. With this version the piezoelectric elements can be contacted simply and reliably.

A further preferred aspect of the invention relates to a mobile input device with a keyless input unit and a mechanism for production of a haptic feedback from the keyless input unit according to one of the aforementioned versions, whereby one of the first support locations of the substrate is fixed on a structure of the input device and one of the second support locations of the substrate is fixed on the input unit.

The preferred embodiments and applications of the invention are described in detail in the following with reference to the enclosed drawings. The following are shown:

FIG. 1 A perspective view of an input device with a keyless input unit.

Figure 2:
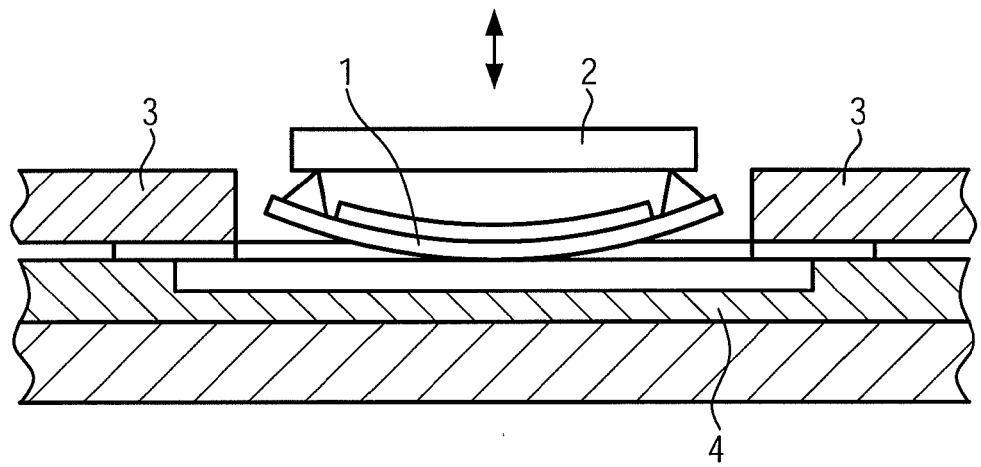

FIG. 2 A schematically illustrated sectional view of the input device with a keyless input unit and the device according to the invention for producing a haptic feedback from the keyless input unit.

Figure 3:
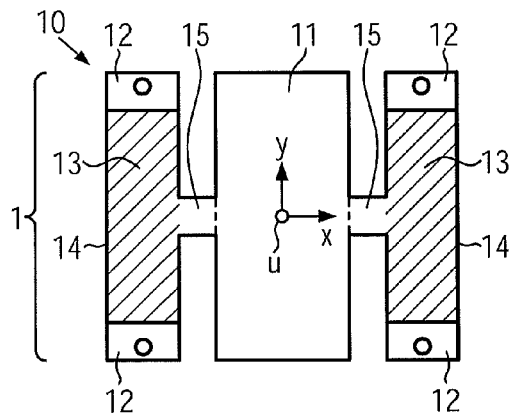

FIG. 3 A plan view of a device according to the invention for the production of a haptic feedback from the keyless input unit according to Variant 1.

Figure 4:
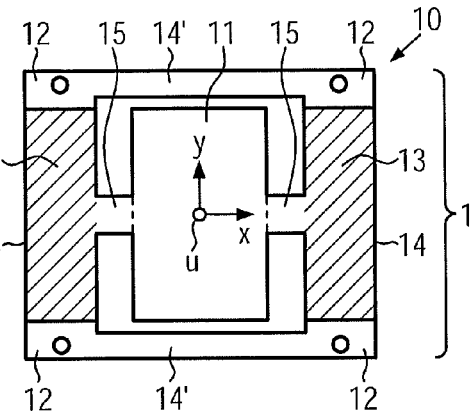

FIG. 4 A plan view of a device according to the invention for the production of a haptic feedback from the keyless input unit according to Variant 2.

Figure 5:
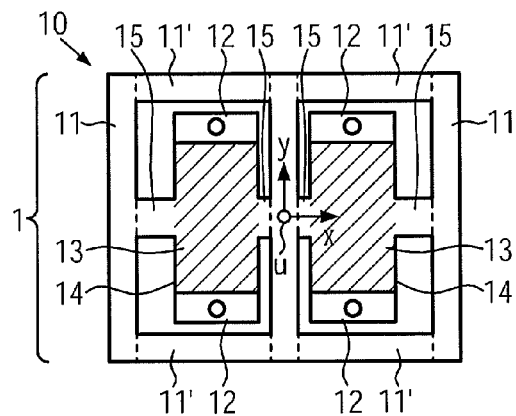

FIG. 5 A plan view of a device according to the invention for the production of a haptic feedback from the keyless input unit according to Variant 3.

Figure 6:
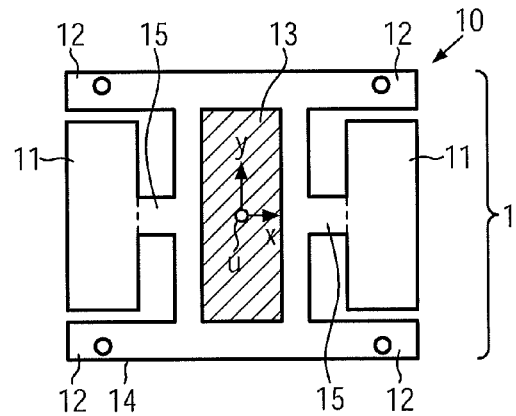

FIG. 6 A plan view of a device according to the invention for the production of a haptic feedback from the keyless input unit according to Variant 4.

Figure 7:
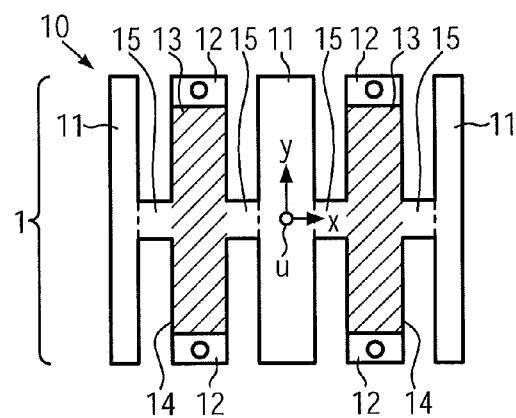

FIG. 7 A plan view of a device according to the invention for the production of a haptic feedback from the keyless input unit according to Variant 5.

Figure 8:
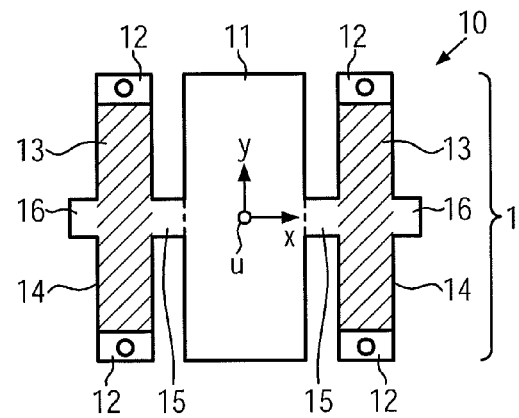

FIG. 8 A plan view of a device according to the invention for the production of a haptic feedback from the keyless input unit according to Variant 6.

FIG. 1 shows a perspective view of an input device with a keyless input unit 2. The input device is equipped as a mobile input device (PDA) with a keyless input unit 2 and the device according to the invention for producing a haptic feedback from the keyless input unit 2. The input unit 2 comprises a so-called touchscreen.

FIG. 2 shows a schematically illustrated sectional view of the input device with the keyless input unit 2. The figure illustrates a front housing 3 of the input device, the display of the keyless input unit 2, the device 1 according to the invention for producing a haptic feedback from the keyless input unit 2 and a circuit board or card 4, which is arranged under the device 1 according to the invention and which bears electronic functional units of the input device and through which the electrical drive of the device 1 according to the invention, in particular of the piezoelectric elements, occurs. The housing forms a structure of the input device for the purposes of the invention. Provided the required function of the haptic feedback from the keyless input unit 2 is ensured, the device 1 can however also be alternatively fixed to other parts of the structure of the input device, e.g. the circuit board or card 4.

FIG. 3 illustrates a plan view of a device 1 according to the invention for the production of a haptic feedback from the keyless input unit according to Variant 1. The device 1 according to the invention for the production of the haptic feedback from the keyless input unit according to Variant 1 comprises an elastic and flexible, essentially plate-shaped substrate 10, which comprises a first support location 11 for fixing the substrate 10 on a structure of the input device and a total of four second support locations 12 for fixing the substrate 10 on the input unit, and is formed such that it supports the input unit movably with respect to the structure of the input device. As first support locations 11, the sections of the substrate 10 are designated, which are coupled to a structure of the input device during the assembly of the input device. As second support locations 12, the sections of the substrate 10 are designated, which are coupled to the input unit 2 during the assembly of the input device. The substrate 10 is produced in one piece from circuit board material, metal, plastic or ceramics. In order to ensure contacting of the piezoelectric elements, the substrate 10 is produced from electrically conducting material and/or coated with electrically conducting material.

The first and second support locations 11, 12 are situated on the first and second support sections 11, 14, which are cut free from the substrate 10 and are joined via the ridge 15. The rectangular and strip-shaped support sections 11, 14 extend parallel to one another, respectively perpendicular to the ridge 15 and to both sides of the ridge 15, whereby the first support section 11 is arranged between two second support sections 14. In this case the complete first support section 11 is coupled to a structure 3 of an input device and thus forms the first support location 11. However, only parts of the first support section 11 can be coupled to a structure 3 of an input device. The total of four second support locations 12 are arranged mirrored about the axes x, y, which intersect at a central point or origin U of the substrate 10, on the substrate 10 at the free ends of the second support sections 14. In the corner regions of the substrate 10 round openings are illustrated, which are arranged central to the support locations 12 and passable to connecting means to couple the substrate 10 to the input unit. The first and second support sections 11, 14 extend parallel to the x axis and the ridges 15 between the first and second support sections 11, 14 extend on or are parallel to the y axis.

Piezoelectric elements 13 are arranged between the first and second support locations 11, 12 of the substrate 10 on the second support sections 14 such that with an electrical drive to the piezoelectric elements 13 the four second support locations 12 opposite the first support location 11 are moved, in particular perpendicular to the plane of the plate-shaped substrate 10 out of the plane of the plate-shaped substrate 10. The piezoelectric elements 13 can be fitted to an upper side and/or an underside of the substrate 10 or embedded in the substrate 10.

The substrate 10 and the complete device 1 are preferably formed mirrored about the axes x, y in order to be able to ensure even lifting and lowering of a coupled input unit with respect to a coupled structure of an input device FIG. 4 illustrates a plan view of a device 1 according to the invention for the production of a haptic feedback from the keyless input unit according to Variant 2. Differently from Variant 1, the second support sections 14, which are arranged on both sides of the first support section 11, are joined together by the ridges 14' and form a closed frame which fully surrounds the first support section 11. The first and second support sections 11, 14 are connected centrally by the ridges 15. Other than that, the device 1 can have the same features as explained in conjunction with Variant 1. Also, the same reference numerals are used as have been explained in conjunction with Variant 1.

FIG. 5 illustrates a plan view of a device 1 according to the invention for the production of a haptic feedback from the keyless input unit according to Variant 3. Differently from Variant 1, not only is a first support section 11 arranged between the second support sections 14, but rather two further first support sections 11 are arranged outside of the second support sections 14. The first support sections 11 are connected via ridges 11' to form a closed frame which fully surrounds each of the second support sections 14. The first and second support sections 11, 14 are connected centrally by the ridges 15. Other than that, the device 1 can have the same features as explained in conjunction with Variant 1. Also, the same reference numerals are used as have been explained in conjunction with Variant 1.

FIG. 6 illustrates a plan view of a device 1 according to the invention for the production of a haptic feedback from the keyless input unit according to Variant 4. Differently from Variant 1, a second support section 12 is arranged between two first support sections 11, whereby the ends of the second support sections 14 are formed essentially T-shaped in order to form an open, essentially H-shaped frame, which accommodates the first, essentially rectangular support sections 11 in the recesses of the H profile and in each case surrounds three of the four sides. The support locations 12 are located on the free ends of the T-pieces. The first and second support sections 11, 14 are connected centrally by the ridges 15. Other than that, the device 1 can have the same features as explained in conjunction with Variant 1. Also, the same reference numerals are used as have been explained in conjunction with Variant 1.

FIG. 7 illustrates a plan view of a device 1 according to the invention for the production of a haptic feedback from the keyless input unit according to Variant 5. Differently from Variant 1, a total of three parallel, rectangular and strip-shaped first support sections 11 are arranged between and outside of a total of two parallel, rectangular and strip-shaped second support sections 12. The support locations 12 are located on the free ends of the second support sections 14. The first and second support sections 11, 14 are connected centrally by the ridges 15. Other than that, the device 1 can have the same features as explained in conjunction with Variant 1. Also, the same reference numerals are used as have been explained in conjunction with Variant 1.

FIG. 8 illustrates a plan view of a device according to the invention for the production of a haptic feedback from the keyless input unit according to Variant 6. Differently from Variant 1, ridge-type shoulders 16 are provided outside of the parallel strip-shaped and rectangular second support sections 12. Other than that, the device 1 can have the same features as explained in conjunction with Variant 1. Also, the same reference numerals are used as have been explained in conjunction with Variant 1.

In a second embodiment of the invention the device is formed as a single bending actuator according to the design of a piezoelectric patch transducer, whereby the piezoelectric element is embedded in the substrate and the electrical contacting is realised using flexible and vibration-proof leads. The substrate is preferably designed as in the first embodiment. Alternatively, the device construction can also be arranged such that a commercially available piezoelectric patch transducer, e.g. 'DuraAct', is embedded in a passive substrate (for example a metal plate). Piezoelectric patch transducers of this nature have the following principal fields of application: Noise reduction, vibration control, contour deformation and stabilisation, power generation (energy harvesting), highly dynamic and precisely actuating elements and damage monitoring (health monitoring). As piezoelectric components the patch transducers (also known as patch actuators) convert electrical voltage into mechanical energy and vice versa. They can be used both as bending actuators, precision actuators, highly dynamic sensors or also as power generators. The base layer is a thin piezoceramic film, which is covered with electrically conducting material for electrical contacting and then embedded in a ductile polymer composite material. The intrinsically brittle piezoceramic material is in this way mechanically pretensioned and electrically insulated and is so rugged that it can be applied to curved surfaces with bending radii of up to 20 mm.

The device 1 according to the invention is realised as follows:

The device according to the first embodiment of the invention is illustrated in FIGS. 3 to 8 and comprises the Variants 1-6. The basic idea is to form the device 1 as an actuator unit which can be simply assembled, which is based on the principle of the piezoelectric bending actuator, facilitates easy retention (fixed end) and which has at least two, better though four, freely movable ends of the partial bending elements, which in their geometrical embodiment can be coupled to the four corners of the display. The basic principle is illustrated in FIG. 3 as Variant 1. A passive substrate 10, which in its dimensions essentially corresponds to those of the display, is designed such that it contains two strip-shaped second support sections 14 which are retained in the middle. On these second support sections 14 a piezoelectric plate 13 is bonded in each case such that two unimorphous bending elements are produced supported in the centre. When the piezoelectric actuator 13 is electrically driven, the free ends of the strip-shaped second support sections 14, on which the second support locations are arranged, can move relatively out of the plane of the undeformed substrate 10, in particular perpendicular to the plane of the undeformed substrate 10.

Advantageously, the substrate 10 is metallised at least on one side, by means of which electrical contacting of the piezoceramic transducer 13 is realised already during the adhesion process. Through a structured embodiment of the substrate metallisation, the second electrode of the piezoceramic transducer 13 can be connected to the metallisation of the substrate 10 by a short electrical connection. To increase the ruggedness of the device 1 however, the complete second electrode area of the piezoelectric transducers 13 can be bonded with flexible and strain-resistant contacting, which in turn is connected to the metallisation of the substrate 10.

Printed circuit board material, such as FR-4 substrate, can be used as the substrate material. Principally however, other materials, such as metals, plastics, fibre-reinforced plastics or ceramic substrates, can be used.

The piezoelectric element 13 is preferably a piezoceramic plate or a plate of monocrystalline material. In addition, the piezoelectric element can have a multilayer construction with inner electrodes, arranged between the piezoelectric material layers (inner electrodes) and outer electrodes, which provide the contact to the inner electrodes (outer electrodes), whereby the inner electrodes can be arranged both in parallel as well as perpendicular to the outer electrodes to make appropriate use of piezoelectric effects ($d_{31}$ or $d_{33}$). The piezoelectric element 13 can however also be a piezoelectric patch transducer.

Due to the geometric dimensions, in particular the thickness of the substrate 10, the width of the strip-shaped first and second support sections 11, 14 and the piezoelectric transducers 13 as well as due to Young's Modulus for the substrate 10, the deflection at the free ends of the support sections 11, 14 and the blocking force can be set within wide limits. Through an experimental test set-up it has been possible to show that the required parameters can be achieved with regard to the deflection and the blocking force. It is much more important however that a haptic signal can be generated.

The device 1 according to the invention offers a large number of signalling possibilities. A steep switching edge or a short pulse generates a so-called "click" signal, a burst drive generates a vibration signal, which with optimum dimensioning can also replace an additional device for producing a vibration alarm. The described variants are only examples and further embodiments are conceivable which can be adapted to the respective use. The structured printed conductors on the substrate 10 can be fitted with further contacting elements, which facilitate a simple electrical connection to other electronic units in the device.

It is however also conceivable that other electronic components are fitted directly on the substrate 10. For the mechanical connection of the device 1 according to the invention with the input unit (display) 2 on one side and the structure of the input device (housing) on the other side, simple mountable joining elements can be fitted to the appropriate support locations 11, 12 of the substrate 10.

The device according to the second embodiment of the invention is aimed at realising the required functionality through or with the aid of a structured piezoelectric patch transducer. Principally, a piezoelectric patch transducer can be constructed such that it contains an integrated bending function. To do this it is necessary to embed the piezoceramic plate in the patch transducer such that the central plane of the plate does not coincide with the central plane of the patch transducer. All mechanical and electrical contacting elements can be integrated in the patch transducer. A structured patch transducer of this nature offers more ruggedness compared to the first embodiment of the invention.

The invention has the following advantages:

The suggested approaches to the solution fulfil the requirement for a haptic (tactile) feedback, so that the display of a keyless input unit is movable as a whole essentially perpendicular to the housing surface in at least one direction. Economical electrical engineering materials can be used. The substrates 10 can be manufactured with standard methods in printed circuit board technology. Standard solutions in printed circuit board technology can be employed both for the electrical contacting and also for the mechanical coupling.

The invention claimed is:

1. Device for the production of a haptic feedback from a keyless input unit of an input device, comprising:
    an elastic, essentially plate-shaped substrate, which comprises at least one first support location for fixing the substrate on a structure of the input device and at least one second support location for fixing the substrate on the input unit, and wherein the substrate is configured to support the input unit movably with respect to the structure of the input device; and
    a piezoelectric element arranged between the first and second support locations of the substrate and with an electrical drive to the piezoelectric element, at least one of the first and/or second support locations moves transverse to a plane of the plate-shaped substrate.

2. A device according to claim 1, wherein the piezoelectric element is embedded in the substrate.

3. A device according to claim 2, wherein a piezoelectric element is fitted to an upper side and/or an underside of the substrate.

4. A device according to claim 2, wherein several second support locations are arranged symmetrically on the substrate.

5. A device according to claim 2, wherein the at least one first and second support locations are located on first and second support sections, which are connected via a ridge.

6. A device according to claim 1, wherein a piezoelectric element is fitted to an upper side and/or an underside of the substrate.

7. A device according to claim 6, wherein several second support locations are arranged symmetrically on the substrate.

8. A device according to claim 6, wherein the at least one first and second support locations are located on first and second support sections, which are connected via a ridge.

9. A device according to claim 1, comprising:
    several second support locations arranged symmetrically on the substrate.

10. A device according to claim 1, wherein the at least one first and second support locations are located on first and second support sections, and the first and second support sections are connected via a ridge.

11. A device according to claim 10, wherein at least one of the first and second support sections is cut free from the substrate.

12. A device according to claim 10, wherein the first and second support sections extend laterally, to the ridge.

13. A device according to claim 1, wherein the at least one second support location is arranged on a free end of a second support section.

14. A device according to claim 1 comprising:
    a first support section is arranged between two second support sections and/or vice versa.

15. A device according to claim 1, wherein at least one first support section forms a frame surrounding a second support section at least over half of its circumference and/or vice versa.

16. A device according to claim 1, wherein the piezoelectric element is arranged in and/or on a second support section.

17. A device according to claim 1, wherein the substrate is formed in one piece.

18. A device according to claim 1, wherein the substrate is produced from printed circuit board material, metal, plastic or ceramics.

19. A device according to claim 1, wherein the substrate is produced from electrically conducting material and/or coated with electrically conducting material.

20. A mobile input device with a keyless input unit and a mechanism for production of a haptic feedback from the keyless input unit according to claim 1, wherein one of the first support locations of the substrate is fixed on the structure of the input device and one of the second support locations of the substrate is fixed on the input unit.

* * * * *